United States Patent

Bardenheuer et al.

[11] Patent Number: 6,084,953
[45] Date of Patent: Jul. 4, 2000

[54] INTERNET ASSISTED RETURN CALL

[75] Inventors: Christian P. Bardenheuer; Warner R. Johnson, Jr., both of New York, N.Y.; Guibert Englebienne, Buenos Aires, Argentina

[73] Assignee: Axicom Communications Group Inc., New York, N.Y.

[21] Appl. No.: 09/143,487

[22] Filed: Aug. 28, 1998

[51] Int. Cl.[7] .................................................. H04M 15/00
[52] U.S. Cl. .......................... 379/114; 379/111; 379/112; 379/119
[58] Field of Search ................... 379/111–112, 114–116, 379/118, 120–121, 124, 127, 130, 140, 143, 144

[56] References Cited

U.S. PATENT DOCUMENTS

| 5,506,893 | 4/1996 | Buscher et al. | 379/114 |
| 5,699,528 | 12/1997 | Hogan | 395/240 |
| 5,784,442 | 7/1998 | Foti | 379/114 |
| 5,953,398 | 9/1999 | Hill | 379/112 |

FOREIGN PATENT DOCUMENTS

WO 92/01350  1/1992  WIPO .............................. H04M 3/42

OTHER PUBLICATIONS

AT&T Communications, Adm. Rates and Tarriffs, 3rd Revised p. 178.69.1, Dec. 27, 1992.

*Primary Examiner*—Curtis A. Kuntz
*Assistant Examiner*—Binh K. Tieu
*Attorney, Agent, or Firm*—Baker Botts L.L.P.

[57] ABSTRACT

A system and method for performing a return call telephone operation in connection with a network such as the Internet to provide real time registration and bill presentment for the customer. The method includes the steps of electronic registration with a telephone service provider via the network, assigning a unique return call initiation telephone number to the customer, performing the return call process, calculating the cost of the telephone call and presenting the cost information to the customer in real time. The network activation allows a customer to sign up and make a return call immediately after registration. The cost information can be tailored to an individual customer through the use of cost tables associated with different components of the overall cost (phone rate) of the telephone call.

36 Claims, 7 Drawing Sheets

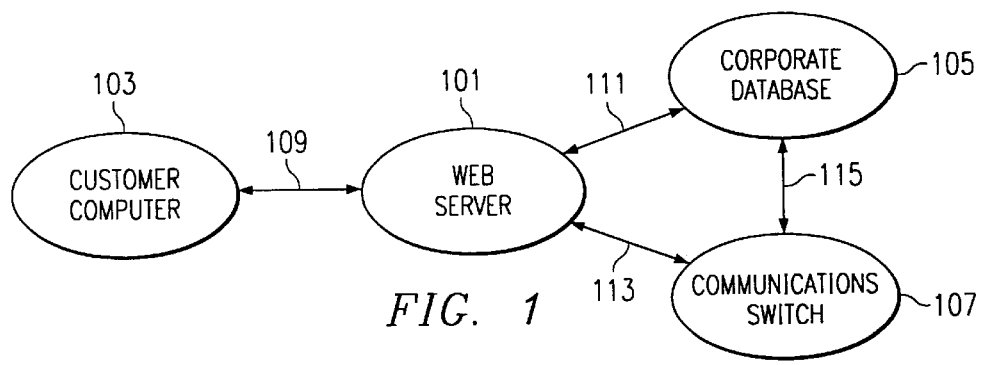
FIG. 1
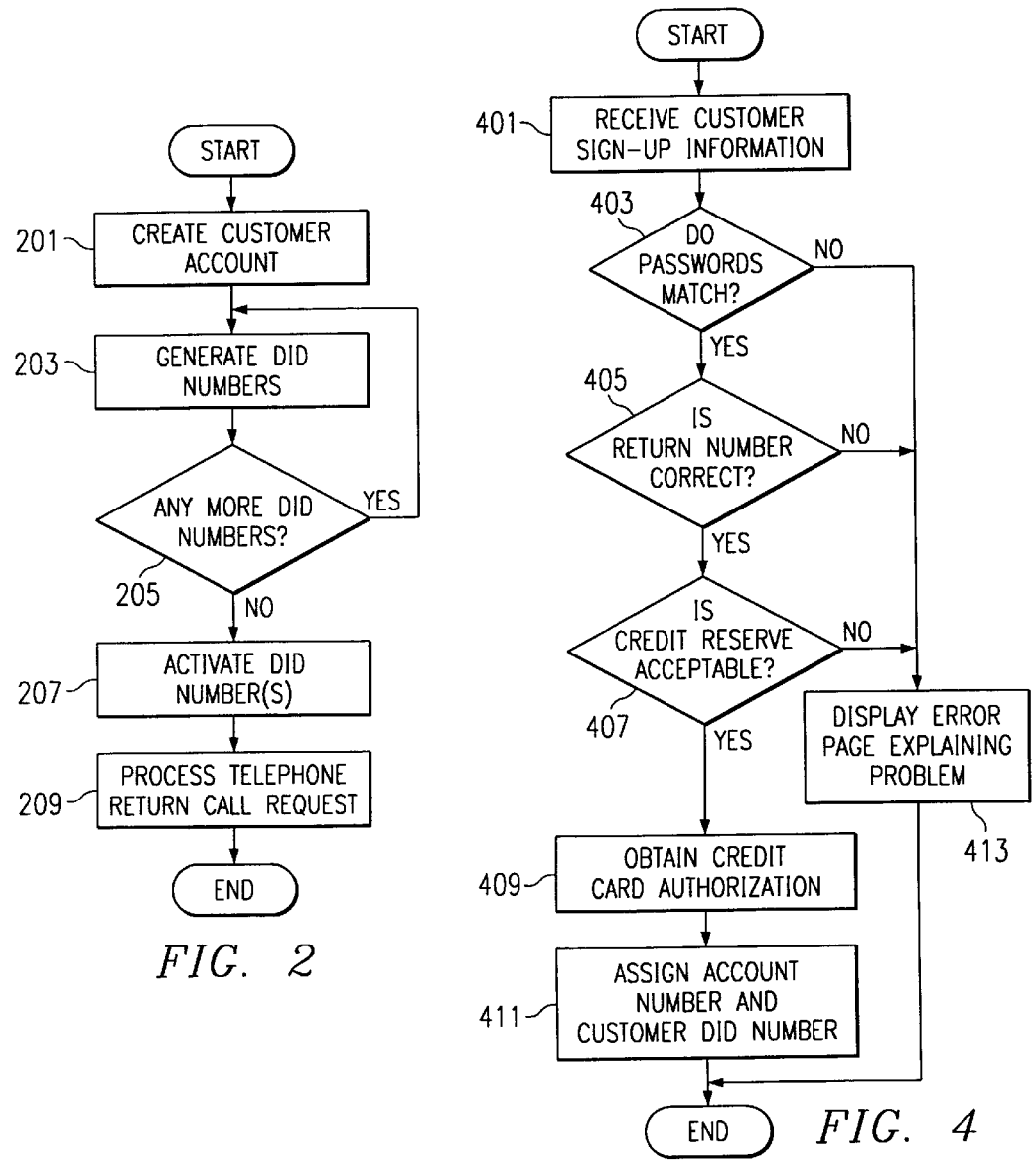
FIG. 2
FIG. 4

TOTAL COST/MINUTE — 505

| TO: | U.S. | U.K. | CHINA | AUSTRALIA |
|---|---|---|---|---|
| FROM: U.S. | $.10 | .90 | 1.25 | 1.15 |
| U.K. | .83 | .28 | 1.22 | 1.55 |
| CHINA | 2.52 | 2.72 | 2.80 | 2.48 |
| AUSTRALIA | 2.52 | 1.97 | 2.57 | 2.70 |

*FIG. 5A*

TELEPHONE LINE COST — 513

| TO: | U.S. | | U.K. | | CHINA | | AUSTRALIA | |
|---|---|---|---|---|---|---|---|---|
| FROM: | A | B | A | B | A | B | A | B |
| U.S. | $.07 | .05 | .43 | .45 | 1.15 | 1.12 | .57 | .57 |
| U.K. | .38 | .41 | .12 | .14 | .63 | .61 | .78 | .78 |
| CHINA | 1.29 | 1.26 | 1.31 | 1.36 | 1.48 | 1.40 | 1.21 | 1.24 |
| AUSTRALIA | 1.24 | 1.26 | .97 | .98 | 1.38 | 1.28 | 1.49 | 1.35 |

*FIG. 5B*

PROFIT

*FIG. 5C*

SYSTEM ACCESS COST

*FIG. 5D*

OVERHEAD

*FIG. 5E*

CUSTOMER ADJUSTMENT

| John Doe | 805 | 809 | 807 | Invoice N° 202151 |

Detail of itemized calls for: 2128333951

| Date | Time | From | Country | To | Length | Price |
|---|---|---|---|---|---|---|
| 5/25/1998 | 11:55 | 18094793212 | United States | 12127854388 | 2.70 | 1.86 |
| 5/27/1998 | 09:26 | 18094793212 | United States | 13057163438 | 1.60 | 1.10 |
| 5/27/1998 | 09:27 | 18094793212 | United States | 130571684361 | 2.10 | 1.45 |
| 6/09/1998 | 10:03 | 18094793212 | Colombia | 0115713259252 | 4.30 | 6.19 |
| 6/09/1998 | 10:18 | 18094793212 | United States | 13057163261 | 2.00 | 1.38 |
| 6/09/1998 | 10:36 | 18094793212 | Tunisia | 0112163122290 | 2.30 | 4.69 |
| 6/15/1998 | 11:06 | 18094793212 | United States | 17132653709 | 2.30 | 1.59 |
| 6/18/1998 | 10:21 | 18094793212 | United States | 19162666754 | 1.60 | 1.10 |
|  |  |  |  | Totals | 18.9 | 19.36 |

801

| John Doe | 805 | 809 | 807 | Invoice N° 202151 |

Detail of itemized calls for: 9172649982

| Date | Time | From | Country | To | Length | Price |
|---|---|---|---|---|---|---|
| 5/25/1998 | 10:02 | 18095673478 | United States | 13055337394 | 7.70 | 5.31 |
| 5/28/1998 | 08:42 | 18095673478 | United States | 13058284404 | 7.90 | 5.45 |
| 5/28/1998 | 09:01 | 18095673478 | Switzerla | 01141322293600 | 2.80 | 5.29 |
| 5/28/1998 | 09:39 | 18095673478 | United States | 13058285504 | 3.50 | 2.42 |
| 5/28/1998 | 16:48 | 18095673478 | United States | 13054771233 | 4.00 | 2.76 |
| 5/29/1998 | 11:00 | 18095673478 | United States | 13056685601 | 1.00 | 0.69 |
| 5/29/1998 | 11:02 | 18095673478 | United States | 13055943350 | 1.50 | 1.04 |
| 6/02/1998 | 13:05 | 18095673478 | United States | 1305594034 | 2.40 | 1.66 |
| 6/02/1998 | 14:47 | 18095673478 | United States | 13055940340 | 1.00 | 0.69 |

Detail of Calls

Please enter your DID number and PASSWORD in order to get your call report.

DID number [2125044258] — 903
Password [        ] — 905
Period [8/4/98] [8/4/98] (Format mm/dd/yy)
       907      909

[Submit]

If you don't remember your PASSWORD or DID, please contact us.

901

6,084,953

INTERNET ASSISTED RETURN CALL

FIELD OF INVENTION

This application relates to the system and method for performing a Return Call telephone technique in conjunction with the use of the Internet or other network for real time registration and billing.

BACKGROUND OF INVENTION

The deregulation of telephone companies in the United States and in other parts of the world has allowed greater competition among telephone service providers to provide cheaper services to customers for both domestic and international telephone calls. For a number of years, the United States government has licensed telephone businesses to resell or lease telephone lines from the larger carriers in order to help foster competition among telephone providers globally. In order to provide telephone services or leased lines at cheaper telephone rates for their customers, some of these resellers use a technique which is known in the industry as a Return Call (also called call back). A Return Call works as follows: (1) a customer dials a telephone number assigned to the customer which connects to the service provider and hangs up after one ring; (2) the service provider automatically calls back the customer within 5 to 15 seconds and emits a dial tone; (3) the customer inputs the telephone number which he or she is calling; and (4) the service provider calls the desired number over its resold or leased lines and conference calls in the customer thus establishing a telephone link between the desired destination and the customer. The cost of these calls is much lower than standard telephone calls because the lines can be leased or resold very cheaply and resellers operate with lower overhead. Any inconvenience of dialing an access number first and waiting for the automatic Return Call is mitigated by the great savings in price for the customer.

Current implementations of the Return Call strategy have some disadvantages which contribute to customers selecting other telephone options. First, the process of signing up with a Return Call service provider is normally a very lengthy and time consuming process. For example, typically customers have to first acquire a registration form from a service provider agent (which could be located in a different city or country), complete the registration information, identify a form of payment for the calls, send the forms back to the agent, wait for approval and finally receive their access number. This process could take two to three days or even over a week depending upon the form of communication used (facsimile versus mail versus air courier). This means that if new customers wanted to make a low cost Return Call, they must wait a number of days before their registration information is processed and the access number is assigned. Additionally, customers may be required to personally appear before the agent (or the Agent must appear at customer location) to verify the customer's identity for billing information which makes the process difficult.

The Internet provides a new form of communication where a person with a computer and Internet hookup can communicate with any person or company anywhere in the world almost immediately. The Internet can provide instant access to a telephone service provider and allows for the quick exchange of information. It would be advantageous for customers to be able to register quickly and to make their Return Call phone calls immediately after completing a registration form.

Conventional telephone companies know the location of the telephones upon which phone calls are made. The telephone company hooks up each telephone and sends a monthly bill to the person's house by mail. A customer typically has to wait for the bill to review the telephone calls made by a home or business. This does not allow interim auditing of the bills and a customer cannot attempt to control calling costs before the customer receives the bill for the call. It would be advantageous for a customer to get immediate access to their call detail information.

Conventional telephone companies have developed a number of different calling plans with different pricing structures for its customers. Some examples are cheaper weekend rates, having a set number of selective phone numbers which are cheaper than others and rates which decrease over a certain usage. However, these plans are limited in number and hard to understand. It would be advantageous to have a telephone service provider who could easily customize telephone costs for a particular customer.

SUMMARY OF THE INVENTION

The invention is directed to a system and method for activating an account and providing billing information over a network all in real time in connection with a telephone call made with a Return Call function. A customer sends identification information to a service provider over a network which opens an account for the customer after identity and payment mechanisms are checked and validated during the registration process in real time. The customer is then assigned an access number which is used in the Return Call function to set up a call. The customer then can make a Return Call telephone call immediately using the access number. The period of time spent on the call is tracked by a communications switch and the length of call information is provided to a corporate database. The corporate database stores the customer information and calculates the cost of the call based upon the length of the call and other cost components which are stored preferably in table form customized for the individual customer. The cost components are also responsive to the country or region from which the call is placed and the country or region to which the call is placed.

A Return Call telephone call is performed by calling the individual access number supplied by the telephone service provider, letting the phone ring once and then hanging up, receiving an automatic call back from the telephone service provider, entering the destination telephone number and being connected to the destination telephone number. The use of the Return Call function allows for much cheaper rates than standard calls because the telephone service provider can direct the calls over lower cost telephone lines which it leases, resells or owns.

The cost of a call is calculated based upon a number of cost components which can individually be changed very easily thus changing the overall cost (or rate per minute) of the telephone call. The call detail invoice or billing statement for a customer can be accessed immediately following the call over the network via the service provider's web site. In addition, at the end of each billing period an invoice and the related call detail billing information will be automatically electronically mailed to the customer.

BRIEF DESCRIPTION OF THE DRAWINGS

Further objects, features and advantages of the invention will become apparent from the following detailed description taken in conjunction with the accompanying figures showing illustrative embodiments of the invention, in which FIG. 1 is a diagram of the Internet assisted Return Call system;

FIG. 2 is a flow chart of the steps for initiating a Return Call request;

FIG. 4 is a flow chart of the steps performed by the telephone service provider to activate a customer account;

FIGS. 5A–5F are examples of cost component tables stored in the corporate database;

FIG. 8 is an example of a detailed invoice screen;

Figure 3:
FIG. 3 is an example of a Return Call sign up form.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

Combining the telephone Return Call telephone technique with the advantages of the Internet or other network allows a customer to instantly register with the service provider and be able to make inexpensive call back telephone calls almost immediately. Additionally, an Internet billing module working in conjunction with a service provider's web site and communications switch can be accessed which prices the telephone calls individually for each customer or group of customers and allows immediate access to the billing information. For example, a company can negotiate a deal with the telephone service provider and obtain lower rates for certain destination countries of international calls or for certain times of the day. The billing module allows for real time calculation of the rate for the telephone calls made and allows for real-time display of the call detail via the Internet. The use of the Return Call technique with the Internet also allows for the use of e-mail (electronic mail) to help communication between the service provider and the customer. While this description uses the Internet as a preferred embodiment, the system and methods described also apply to other networks which connect a customer to the telephone service provider.

FIG. 1 is a diagram of the Internet assisted Return Call system. The system includes web server 101, customer computer 103, corporate database 105 and communications switch 107. Web server 101 assists in the communications between the customer and the service provider for performing the internet assisted Return Call technique. Web server 101 includes a computer hardware platform and software running on the hardware platform to support a service provider's web site. The Web site preferably has a standard Internet address which can be accessed by the customer, for example, "Axicomonline.com". The customer computer 103 connects with the Internet using conventional techniques such as a browser program and identifies the web page of the service provider by entering the web address on the browser or link through a hyperlink. The customer computer 103 can be any terminal which connects to the internet including a web cable terminal, a low cost internet terminal with minimal functions or a standard computer. Information is then exchanged between the customer and service provider web site over web connection 109 such as registration information, phone rate information, billing information and calling information. The web server 101 supporting the web page is connected to a corporate data 105 base via information conduit 111. Information conduit 111 can be for example an Internet link, a separate communications line connected by modem or a dedicated line. Corporate database 105 stores information regarding customer registration, telephone rates, billing information and phone usage. Corporate database can be supported by its own stand alone computer, exist as part of network software, as a separate Internet web site or as part of the Internet web site on web server 101. Information is transmitted in either direction between the web server 101 and the corporate database 105 as described below.

Communications switch 107 is connected to web server 101 via information conduit 113. Information conduit 113 can be an Internet link, a separate communications line connected by modem or a dedicated line. Communications switch 107 controls which telephone lines upon which the calls are placed. The service provider owns, leases or resells certain telephone lines and these lines are assigned specific telephone calls depending upon the calls requested by its customers. Selection of the least cost telephone lines for a particular call can be optimized by using least cost routing software resident with the corporate database to choose the cheapest available telephone rate from different companies for the call to be made. The use of telephone service provider's least cost routing software allows the service provider to price the calls inexpensively. The communications switch also monitors the length of the call and transmits the usage information to the corporate database 105 via web server 101, information conduit 115, or other means. A direct connection using information conduit 115 between the communications switch 107 and corporate database 105 can be established and utilized.

FIG. 2 is a flow chart of the steps for initiating a Return Call request for a first time customer over the Internet. Step 201 creates a customer account for which the related information will be stored in corporate database 105. In order for a customer to make a call, the correct billing information and payment authorizations (such as a credit card) must be collected and stored in the corporate database 105. This information can be input over the Internet by the customer into a information template appearing at the telephone service provider's web page. The specific information which is collected is further described in FIG. 3.

Step 203 creates a customer account and assigns a DID (Direct Inward Dialing) number for each telephone for which the customer desires to use the call back service. Each telephone number of the customer will have its own DID number so that multiple employees with different telephone numbers can make use of the service at the same time. For example, if a company has five employees each with their own telephone numbers, five DID numbers can be created, one for each employee all of which may be in one account. Alternatively, a small company could have only one DID number to help control the usage of the Return Call service. The DID number allows a customer or business to track who made what calls. Each DID number assigns a unique telephone number for the particular customer will call to initiate the Return Call technique. The customer will then call the DID number, let the phone ring preferably once and then hang up. There is no charge for this initial call. Within approximately 5 to 15 seconds, the telephone service provider's network who provided the DID will automatically call back the customer. The customer will hear a voice prompt to input the telephone number they want to call. Upon the customer dialing, the service provider will then call the destination telephone number and conference in the customer to the destination telephone number. The telephone call length and cost is tracked by the corporate data base.

Step 205 checks if there are any more DID numbers to create for the customer or business. If there are, the process returns to step 203. If there are not, then the process continues with step 207.

Step 207 activates the DID number or numbers after a proper payment mechanism is established. A preferred method of payment is by credit card. The customer can input his credit card information into the information sheet appearing on the telephone service provider's web page. The credit card information can be kept confidential through conventional encryption/authentication techniques such as SSL (Secure Sockets Layer) or SET (Secure Electronic Transactions). Additionally, certification authorities using digital certificates can be used to verify the origination of the internet messages sent to the service provider. The service provider can upon receiving the payment information reserve a portion of the credit as specified by the customer on the credit card for the next 28 days (this time limit is set by the credit card industry and may vary). The process of pre-authorization (reserving credit) is the same process used by hotels or car rental agencies which set aside a portion of the credit limit on the card for the particular vendor in anticipation of expenses to be charged. This allows the telephone service provider to have some certainty that payments will be made for the calls which are placed during the next billing cycle.

Alternative payment mechanisms can also be utilized. For example, real time authorization of credit or debit cards can be used if the customer has the necessary software residing at his terminal. Additionally, electronic cash accounts or electronic value can be used for immediate payment for the calls being used. The customer would input the location of its electronic cash account or place his card into a card reader at its terminal. Additionally, a customer could prepay for telephone units to be spent much like a prepaid telephone card. The corporate database would keep track of the telephone units purchased by the customer and subtract the units as they were being used for telephone calls. After the payment mechanism is identified and verified in real time for a customer account, the number is ready to use.

In step 209, a telephone Return Call is performed by a customer as outlined in the description of step 203. The length and destination of the call will be tracked by communications switch 107 and that information will be transferred to corporate database 105 for billing and archival purposes.

FIG. 3 shows an example of a Return Call sign up form available on a service provider's web page. Box 301 identifies the name of the telephone service provider (e.g., AxicomOnline™) and the name of the electronic form (in this example, "Return Call Sign Up Form"). Identification information box 303 includes a space for the customer to enter his or her identification information and sign up for the service. The information requested includes, for example, the customer's first and last name, mother's maiden name (for i.d. purposes), address, telephone number, facsimile number, company and e-mail address. The e-mail address information is important because emails are the preferred way to communicate over the Internet. A conformation e-mail message is sent by the service provider to ensure that the e-mail address and other input information is correct. A monthly message will also be sent to the customer which includes invoice information or a request that customer access the server's particular web site to obtain the invoice information. The invoice can contain a summary invoice as well as a detailed list of the calls. If the customer does not have his own e-mail address, (e.g. the customer accessing the web site from a public terminal only) confirmations can be sent by regular mail or facsimile.

The selection of up to three DID numbers is shown as the example of the information sheet. However, any number of DID numbers can be selected in accordance with the invention. The customer will type in the telephone number with country code for which the Return Call service will be used. Also included in the example is a data entry to limit the amount of dollars reserved on a credit card for the billing cycle for a particular telephone and DID. This would allow, for example, a parent to limit the number of calls made by a child or a corporation to limit the dollars spent by a person at one phone before receiving further authorization. It also allows a customer to control the amount of reserved credit on an identified credit card so that the customer can make other purchases with the remaining unreserved credit on the credit card.

Box 307 requests the customer to input a password and to reenter the password to make sure it was typed correctly. The password will be used by the customer to view call detail billing information and not let others view the call detail billing or other customer information without permission.

Box 309 asks the customer to input payment information. In this example, credit card information is requested including the card's expiration date. Alternatively, a space for electronic cash accounts or identification could be requested. Also included in box 309 is the submit button to submit the information to the service provider and a restart button to clear all information if a mistake is made or if the customer changes his mind.

Box 311 describes an option of printing out the form and having the customer fax the information to the telephone service provider for processing. In some cases, customers may feel uncomfortable in sending credit card information over the Internet and instead would prefer sending the information by facsimile. However, encryption and authorization techniques used today make the transfer of payment information relatively secure over the Internet.

Box 313 displays some boxes containing hyperlinks which enable the customer to jump to another desired web page in the service provider's web site. The examples shown are hyperlinks for the home page and for a customer service web page. While specific information is shown in the example of FIG. 3, the invention is not limited to the information shown, and more or less information can be requested as needed by the telephone service provider.

FIG. 4 shows a flow chart of the steps performed by the telephone service provider to activate a customer account in real time. Step 401 receives the customer sign up information from the web browser used by the customer. The information obtained by the service provider from the customer is described in connection with FIG. 3. Once the information is received, some of the information is verified in real time by the web server.

Step 403 checks if the password input on the information form matches the re-entered password on the form from the customer. This ensures that the customer has input the correct password and did not mistype the password. If the passwords do not match, the process jumps to step 413 and displays an appropriate error message. The customer can then correct the information on the information input sheet and resubmits the information.

Step 405 checks if the customer's telephone number which the service will ring back ("Return Call telephone number") is a valid number. If the Return telephone number does not have the proper number of digits for the country to be called or is deficient in another manner, any future Return Call process will fail. The customer may have mistakenly typed in the wrong number and is asked to correct the number. The number can be checked by the corporate database to determine its validity. If the Return number is not valid, then the process jumps to step 413 and an appropriate error message is displayed. The customer can then retype in the correct Return telephone number information and resubmit the sign up information to the telephone service provider. If the return number is a valid number, the process continues with step 407. If the Return telephone number is valid with respect to the number of digits but is simply the wrong telephone number, the customer will receive a validation message via e-mail or telephone so that the customer can make sure the correct Return telephone number is recorded.

Step 407 checks the credit reserve amount selected by the customer. The credit reserve amount can be unacceptable for being too low for a particular customer. If the credit reserve amount requested is below, for example, $20, then insufficient funds would be reserved for typical international phone calls and the customer would have to increase his credit limit. If limit too low, process jumps to step 413 and displays an appropriate error message. If the credit reserve amount is acceptable, then the process continues with step 409. Alternatively, if the charges can be made in real time over the Internet or can be made to debit accounts or electronic cash accounts, the credit reserve amount may not apply.

Step 409 obtains credit card reserve pre-authorization for the future charges up to the inputted credit reserve amount listed in the customer registration information for each DID. For example, if the customer indicated the authorization should be for $100 per month for a DID, an authorization reserve amount of $100 would be requested for that credit card account number. During each billing cycle as telephone charges accrue, the actual charges would be processed to the credit card by the telephone service provider either as the calls occur or in batch mode at the end of the billing cycle. Obtains the authorization at the beginning of the billing cycle allows the service provider to protect itself by reserving the credit limit set by the customer. Alternatively, authorization from an electronic funds account can also be obtained. After real time authorization of the payment method (either over the internet, dedicated line, network or telephone lines) is obtained, the process continues with step 411.

Step 411 assigns the DID number(s) to the customers based upon the number of telephone Return Call numbers requested and communicates the DID numbers to the customer via the service provider's web site. Alternatively, the DID numbers could be sent via e-mail, fax or regular mail. A customer account number is also assigned. Multiple DID numbers can be associated with a single account. The customer is now able to make Return Call telephone calls. The above described service provider processing technique is performed in real time. It allows a customer to make a call seconds after submitting his registration information to the telephone service provider.

FIG. 5A shows an example of a cost/minute table for particular calling routes. Table 501 shows the overall cost rate of a telephone call per minute between two countries for a particular customer. Box 505 shows the type of data stored in the table. Legend 502 shows examples of countries from which the call is being made, i.e., Telephone Return Call number. In this example, the United States, the United Kingdom, China and Australia are shown for illustrative purposes. The table can contain entries for every country in the world with telephone service. One example of a world-wide grid may have 256 countries by 256 countries. Alternatively, the costs can be further divided by states in the United States or by regions in any country. Legend 503 shows the country to which the call is being placed, i.e. the destination number. When the called is placed by the customer, a table lookup is made in a database to retrieve the appropriate cost for the call. For example, if the a customer in the United States is calling Australia, the telephone rate in this example would be $1.15 per minute. If a customer in China was calling the U.K., the telephone rate would be $2.72 per minute. Table 501 is stored in corporate database 105. The database can be a standard lookup database, a relational database or any other type of data storage organization. A summary cost table 501 can be created for each individual customer depending upon the specific circumstances of that customer. For example, a volume discount could be given to a high volume caller. The cost table is preferably a composite of tables each representing a cost component. The presence of a multiple cost component allows the easy charge of individual cost components which will be reflected in selected customer cost tables. A cost table such as table 501 can be created for Internet users who have made special contracts with the telephone service provider or others.

In order to create overall cost table 501 for a customer, different operating costs, overhead and profit figures are used to calculate the final cost for a telephone call rate. FIG. 5B shows a leased cost routing table which reflects the cost of the leased or resold lines (or maintenance and deprecation costs if the telephone lines are owned) between countries. The title of the table is "Telephone Line Cost." Table 511 contains the cost of leasing or reselling the telephoning lines (or the ownership costs including depreciation and maintenance) calculated per minute of phone call. While the cost is shown in dollars and cents, the costs could be calculated on a basis of one tenth a cent or even less. Legend 512 illustrates some countries from which the call is being made and the home phone is located. Legend 513 illustrates some countries to which the calls are being made. For each entry for a call from one selected country to country two costs are shown which reflects that the least cost line is selected from multiple line owners or resellers, offering their lines at different costs. In this example, Company A and B rate information is shown although only one or more than two companies could be included in the chart. The difference in cost can be due to line availability, quality of the line or special promotional offers. In this example, the telephone line cost (from a lease, resell or ownership cost) of a call from the United Kingdom to the United States is either $0.38 or $0.41 per minute. The cheaper cost would be selected by the service provider. The service provider could use a least cost optimizer technique implemented by software. This cost contributes to the overall costs of the call.

FIGS. 5C–5F show additional examples of tables which are stored which can contribute to the overall price rate of the call. These tables can be changed by the service provider and can adjust the price of a call for an individual customer, a group of customers or all customers.

FIG. 5C shows table 531 which is titled "Profit" in box 532. The table is shown for illustrative purposes and includes costs as entries and has legends consistent with the tables shown in FIGS. 5A and 5B. The profit is the amount charged by the telephone service provider. The service provider could use a least cost optimizer technique implemented by software. It can be reflected by a specific dollar value or by a percentage, e.g., 5% of the cost of the call. The profit figure could be changed depending upon the customer or group of customers. By specifying the profit amount for a particular call between specified countries, the service provider can better financially plan for the business and compete in the world.

FIG. 5D shows table 541 which is titled "System Access Cost" in box 542. The table is shown for illustrative purposes and includes costs as entries and has legends consistent with the tables shown in FIGS. 5A and 5B. In the Return Call process, there is a cost in establishing the link between the service provider and the Return telephone number which is then connected to the destination telephone number over leased or owned lines. This cost is indicated by the data which is stored in table 541.

FIG. 5E shows table 551 which is titled "Overhead" in box 552. The table is shown for illustrative purposes and includes costs as entries and has legends consistent with the tables shown in FIGS. 5A and 5B. Overhead costs can include employee costs at the service provider, office equipment depreciation, maintenance and possible lease fees, advertising, marketing and web site related costs.

FIG. 5F shows table 571 which is titled "Customer Adjustment" in box 572. The table is shown for illustrative purposes and includes costs as entries and has legends consistent with the tables shown in Figures 5A and 5B. Customer adjustments can be made for many reasons including a volume discount, an agreed upon rate negotiated with the telephone service carrier, a promotion or any other reason. The customer adjustment table allows the telephone service provider to tailor the telephone rates for each box representing a home country or region called from to a destination country or region which is called.

In the example shown in FIG. 5B through 5F, all these components make up the cost of the telephone call rate shown in FIG. 5A. However, not all of these tables need be used or additional tables can be added as required. Some of the tables which have a consistent expense across all calling areas (2¢ tax or 3% service charge) can be added to the telephone rate chart by formula instead of table. For example, every rate listed in the total cost chart could have 2¢ added to it. All the data tables are stored in the corporate database 105.

Another example of additional expenses irrespective of the countries called from and to is the charge for the use of a credit card. The credit charges reflect the cost of processing credit cards. Credit card processing companies typically charge a percentage rate (e.g., 3%) of the amount charged for processing fees worldwide. These charges are charged to the vendor which in this case is the telephone service provider.

A further example is a fraud charge. Fraud charges could include the cost of using credit cards over the internet. Even when using encryption and authentication techniques to protect the data being transmitted, some credit card fraud will occur. A historical calculation can be obtained and the costs of the fraud can be spread over the length of an average telephone call. For example, typically 3% of the cost of a call is due to fraud losses. Fraud losses will occur for other types of payment methods as well.

The total cost chart for a particular client is accessed automatically by the service provider and is used to calculate the invoices for the calls made by a customer. For new Internet users, an Internet total cost/minute rate chart is used. An individual chart could be created for a repeat customer depending upon any agreement between the customer and the telephone service provider.

Figures 6, 7A:
FIG. 6 is an example of a phone rate request screen.
FIG. 7A is an example of customer invoice request screen.

FIG. 6 shows an example of a screen a customer would view in order to check a current phone rate. The screen appears on the web site of the service provider. The screen is accessed by the web browser of the customer computer 103. Because the costs of making the telephone calls, promotions and market conditions are constantly changing, the rates are always being updated through the use of the rate and cost tables as described in FIGS. 5A through 5F. Screen 601 shows a check rate page for a Return Call. The customer selects the country or region he is located in by clicking or typing the name of the country or region in box 603 or by selecting the country or region from a menu. The customer also selects the country or region that he wants to call by entering the country or region's name in box 605 or be selecting the country or region from a menu. The Web Server then accesses the corporate database, determines the customer identity or uses the default Internet User if no specific customer identity is known, looks up the calling rate based upon the customer identity and the host and destination country and displays the rate.

Figure 7:
FIG. 7 is an example of a customer invoice summary screen.

FIG. 7 is an example of a customer invoice preferably shown on the service provider's web site at the end of a billing cycle. The invoice can be accessed by the customer on-line, can be sent to the customer via e-mail, facsimile, post office or other means. The invoice summarizes the calls and charges accrued for the billing cycle (e.g., monthly or every 28 days). Box 703 indicates the invoice number for the invoice. This number allows the customer and the telephone service provider to uniquely identify the invoice. Box 705 indicates the date of the invoice. Box 709 indicated the company which provides the Return Call service. Box 711 indicates the name and address of the customer who is the subject of the invoice. Column 713 indicates the DID number assigned to the customer. The customer can have one or more DID numbers. The DID number is the number which is called to initiate the Return Call service. Column 715 indicates the Concept or type of service. Standard telephone services are indicated as Telephone Service. Other types of services include the use of calling cards, the use of cellular phones or the use of wholesale services. Column 717 indicates the total charges for each DID used. At the bottom of the column is the total for all of the customer's DIDs.

FIG. 7A is an example of a request for invoice screen 731 shown on the service provider's web site. The customer can input their customer account number in space 733 and their corresponding password in space 735 and can obtain their invoice information if the password is correct. The password is verified by the corporate data base which stores the customer's password.

FIG. 8 shows an example of the detailed invoice 800 which would preferably accompany the example of the summary invoice shown in FIG. 7. Boxes 801 and 803 show the detail for each call made from a DID for the invoice period. The detailed information includes, for example, the date of the call, the time of the initiation of the call, the number of the host telephone which initiated the call, the country or region of the host telephone, the number called, the country or region of the destination number called, the length of the call and the price of the call. More or less information could be displayed as needed. Box 809 shows the DID number (the unique number called to start the Return Call process). Box 805 indicates the customer name. Box 807 indicates the invoice number associated with the detailed costs. The call details shown in FIG. 8 can also be presented for telephone calls made in the middle of the billing cycle or for any selected time period.

The summary invoice described in connection with FIG. 7 and the detailed invoice described in connection with FIG. 8 are preferably presented to the customer together so that the customer can check the invoice for any errors. The detailed invoice can be presented over the Internet, via e-mail, via facsimile, via the post office or any other method. If the invoice information is to be accessed over the internet, extra security is required such as a password so that unauthorized persons do not have access to the invoices of a customer.

Figures 9, 10:
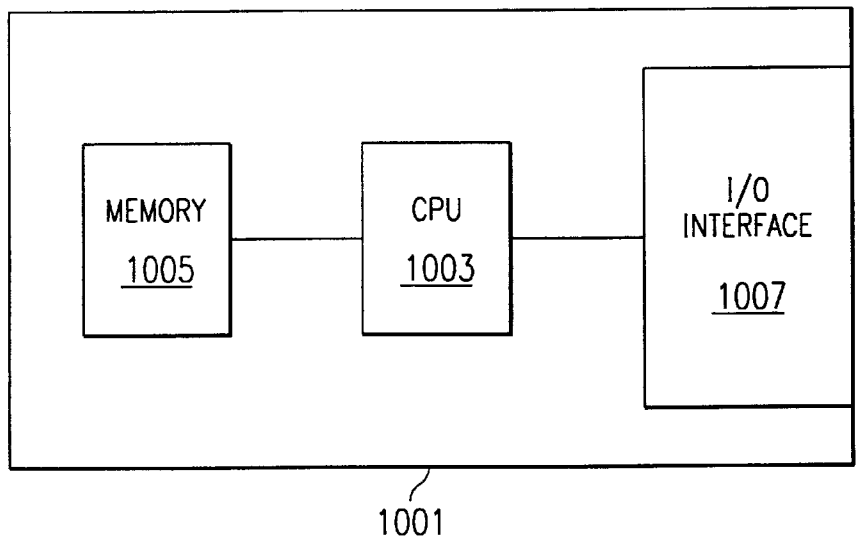
FIG. 9 is an example of a call detail information request screen.
FIG. 10 is a schematic diagram of a computer which can store and process the corporate database.

FIG. 9 shows an example of a screen 901 shown at the internet web site of the telephone service provider when a customer selects an option to shown details of his or her calls. Box 903 requires the input of a particular DID or a customer name. Box 905 then requires the password associated with the particular DID or the customer name. If the password is incorrect, then the user cannot view the detailed record of the calls. If a customer forgets his password, the customer can contact the service provider, authenticate his identity with the service provider using personal information or telephone call history (e.g. the number that was last called using the Return Call feature), and obtain the password. The customer can also specify the time period of the Call Detail report using boxes 907 and 909 to specify the start and end date. If no time period is entered, the default time period can be determined by the service provider. The DID numbers, passwords and telephone detail information are all stored in the corporate database.

As each call is made, the charge for the calls can be made once in a batch mode at the end of the billing cycle for the customer's convenience. Alternatively, the charge for the call can be processed against the reserved credit line after the call is completed. The customer can be given an opportunity to review the bills before charging the credit card. After a billing cycle has been completed, the telephone service provider will obtain automatically in real time a reserved credit line in the amount specified by the customer in the sign up form for next billing cycle. The customer has the ability to review the call details prior to receiving a monthly invoice at any time during the billing cycle through the internet and the service providers web site and a customer or company can audit the current telephone charges at any time. This real time access to all billing information is an important advantage over a system which mails out bills once a month.

FIG. 10 shows a schematic diagram of a computer which can store and process the corporate database. The computer 1001 includes a microprocessor or central processing unit (CPU) 1003, a memory 1005 and an input/output (I/O) interface 1007. The data in the corporate database is stored in memory 1005. Microprocessor 1003 which is connected to memory 1005 and I/O interface 1007 retrieves data from memory 1005, performs cost calculations and receives and transmits data through 1007. Microprocessor 1003 executes program instructions which perform the functions of corporate database as described in this application.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, the system and method for activating an account and providing billing information over a network can be applied to other types of products and services which require immediate enrollment, billing information and control of credit charges. These products and server could include internet mall shopping, book or movie clubs or the purchase of research and information over the internet.

We claim:

1. A method for activating a credit-based account and providing billing information over a computer network from a telephone service provider to at least one customer for performing at least one return call function, comprising the steps of:

receiving identity information of said customer by said service provider over said computer network;

creating in real time said credit-based account responsive to said identity information;

assigning at least one access telephone number to said customer;

performing a return call function to initiate a telephone call responsive to said at least one access number;

calculating cost data indicative of said telephone call's cost; and providing said calculated cost data of said telephone call to said customer over said computer network.

2. The method of claim 1, wherein said calculating step is responsive to said telephone call's length.

3. The method of claim 2, wherein said calculating step is further responsive to overhead costs of said service provider.

4. The method of claim 2, wherein said calculating step is further responsive to costs relating to telephone lines which transmit said telephone call.

5. The method of claim 2, wherein said calculating step is further responsive to customer discounts provided by said service provider.

6. The method of claim 1, wherein said performing a return call function step comprises calling back said customer who called said access telephone number.

7. The method of claim 6, wherein said performing a return call function further comprises receiving a destination phone number at said service provider.

8. The method of claim 7, wherein said performing a return call function further comprises connecting said customer with said destination phone.

9. The method of claim 1, wherein said providing step provides an invoice of said at least one telephone call made with said return call function.

10. The method of claim 9, wherein said providing step further provides a detailed history of said at least one telephone calls made with said return call function.

11. The method of claim 1, wherein said calculated cost data is provided via said service provider's web site.

12. The method of claim 1, wherein said calculated cost data is provided via electronic mail.

13. The method of claim 1, further including the step of checking a password before providing said calculated cost data.

14. The method of claim 1, wherein said identity information comprises said customer's name and payment information.

15. The method of claim 14, wherein payment information is verified prior to assigning said at least one access number.

16. A system for activating a credit-based account and providing billing information to a customer by a telephone service provider over a computer network in connection with making a telephone call using a return call function comprising:

a server computer coupled to said computer network for interfacing with said customer;

a communications switch coupled to said computer network for placing said telephone call using said return call function and providing data representing the length of said return call; and a corporate database coupled to said computer network for storing information comprising both the cost of said return call responsive to said telephone call length data and customer information data;

wherein said communications switch provides said corporate database with said length data, said corporate database calculates and stores cost data indicating said telephone call's cost, said customer communicates with said server computer to access said calculated cost information, and said customer provides identification data to create in real time said account stored in said corporate database prior to making said telephone call with said return call function.

17. The system of claim 16, wherein said server computer supports said service provider's web site.

18. The system of claim 17, wherein said calculated cost data are provided via said service provider's web site.

19. The system of claim 16, wherein said corporate database calculates said cost data responsive to said length of said telephone call made.

20. The system of claim 19, wherein said corporate database calculates said cost data further responsive to overhead costs of said service provider.

21. The system of claim 19, wherein said corporate database calculates said cost data further responsive to costs of telephone lines which transmit said telephone call.

22. The system of claim 19, wherein said corporate database calculates said cost data further responsive to customer discounts provided by said service provider.

23. The system of claim 16, wherein said return call function comprises calling back said customer who initiated said return call.

24. The system of claim 23, wherein said return call function further comprises receiving a destination phone number at said service provider.

25. The system of claim 24, wherein said return call function further comprises connecting said customer with said destination phone.

26. The system of claim 16, wherein said customer database provides a summary invoice of said telephone call made by the return call function.

27. The system of claim 26, wherein said customer database further provides a detailed call history of said telephone calls made by the return call function.

28. The system of claim 16, wherein said identity information comprises said customer's name and payment information.

29. The system of claim 28, wherein payment information is verified prior to assigning to said customer at least one access number.

30. A corporate database computer for storing and processing account and billing information related to at least one customer who makes at least one return call using a telephone service provider comprising:

means for receiving identity information of said customer over a computer network;

means for creating in real time a credit-based account responsive to said identity information;

means for assigning at least one access telephone number to said customer;

means for calculating said return call's cost and storing data indicating said cost; and means for providing said calculated cost data of said return call to said customer over said computer network.

31. The computer of claim 30, wherein said calculating means is responsive to the length of said telephone call.

32. The computer of claim 31, wherein said calculating means is responsive to overhead costs of said service provider.

33. The computer of claim 30, wherein said providing means provides a summary invoice of said at least one telephone call made with said return call function.

34. The computer of claim 33, wherein said providing means further provides a detailed history of said at least one telephone call made with said return call function.

35. The computer of claim 30, wherein said calculated cost data are provided by said providing means via said service provider's web site.

36. The computer of claim 30, wherein said identity information comprises payment information and said payment information is verified prior to assigning said at least one access number.

* * * * *